(12) United States Patent
Lin et al.

(10) Patent No.: US 10,719,952 B2
(45) Date of Patent: Jul. 21, 2020

(54) THIN PLATE IMAGING DEVICE

(71) Applicants: Chih-Hsiung Lin, New Taipei (TW); Chong-Hau Chou, New Taipei (TW)

(72) Inventors: Chih-Hsiung Lin, New Taipei (TW); Chong-Hau Chou, New Taipei (TW)

(73) Assignee: inFilm Optoelectronics Inc., Grand Cayman (KY)

( * ) Notice: Subject to any disclaimer, the term of this patent is extended or adjusted under 35 U.S.C. 154(b) by 0 days.

(21) Appl. No.: 16/580,261

(22) Filed: Sep. 24, 2019

(65) Prior Publication Data

US 2020/0020124 A1  Jan. 16, 2020

Related U.S. Application Data

(62) Division of application No. 15/584,437, filed on May 2, 2017, now Pat. No. 10,467,769.

(51) Int. Cl.
| | |
|---|---|
| *H04N 5/225* | (2006.01) |
| *G06T 7/70* | (2017.01) |
| *G02B 6/42* | (2006.01) |
| *G06T 7/20* | (2017.01) |

(52) U.S. Cl.
CPC .............. *G06T 7/70* (2017.01); *G02B 6/4214* (2013.01); *G02B 6/4295* (2013.01); *G02B 6/4298* (2013.01); *G06T 7/20* (2013.01)

(58) Field of Classification Search
CPC .. G02B 6/0016; G02B 6/0025; G02B 6/4214; G02B 6/4298; G02B 6/00; G06F 3/0421; G06F 3/0425; G06F 3/0428; G06T 7/20; G06T 7/70

See application file for complete search history.

(56) References Cited

U.S. PATENT DOCUMENTS

| | | | | |
|---|---|---|---|---|
| 2008/0029691 | A1* | 2/2008 | Han | G06F 3/04883 250/224 |
| 2009/0267919 | A1* | 10/2009 | Chao | G06F 3/0421 345/175 |
| 2010/0079382 | A1* | 4/2010 | Suggs | G06F 3/0421 345/173 |
| 2012/0138778 | A1* | 6/2012 | Campbell | G02B 6/4214 250/227.11 |
| 2012/0249477 | A1* | 10/2012 | Popovich | G06F 3/042 345/175 |
| 2012/0268427 | A1* | 10/2012 | Slobodin | G06F 3/042 345/175 |

(Continued)

*Primary Examiner* — Kelly L Jerabek (57) ABSTRACT

A thin plate imaging device in accordance with the present invention comprises a guide light plate, at least an imaging unit, at least a photosensitive unit and at least a reflection lens; the guide light plate and the imaging unit are utilized to allow lights to conduct total internal reflection or reflection propagation in one dimension, the photosensitive unit is placed in the path of the total internal reflection or reflection propagation and disposed at the image focus position of the imaging unit; clear images can be obtained without moving the imaging unit or the photosensitive unit back and forth, and objects with different object distances can be imaged on different spots of the photosensitive unit such that relative distances of the objects can be determined by image signals obtained via the photosensitive unit directly.

2 Claims, 7 Drawing Sheets

(56) References Cited

U.S. PATENT DOCUMENTS

2014/0028630 A1* 1/2014 Lin ................. G06F 3/0428
 345/175
2014/0306933 A1* 10/2014 Lin ................. G06F 3/042
 345/175

* cited by examiner

THIN PLATE IMAGING DEVICE

CROSS-REFERENCE TO RELATED APPLICATIONS

The application is a divisional application of application Ser. No. 15/584,437 filed on May 2, 2017.

BACKGROUND OF THE INVENTION

1. Field of the Invention

The present invention relates to an optical imaging technique, and, more particularly, relates to a technique with which a guide light plate is applied to cause total internal reflection (TIR) or reflection propagation of light with photosensitive units being placed in the path of total internal reflection or reflection propagation at the image focus position for objects with different object distances capable of being imaged on different spots of the photosensitive unit.

2. Description of Related Art

A general imaging device includes an imaging lens and a sensor. The imaging lens is designed to be axis-symmetric with respect to an optical axis, and the imaging plane is flat and perpendicular to the optical axis. The sensor is placed on the imaging plane to receive images after focusing and output image signals. For instance, Taiwan Patent No. 1525346 discloses an optical imaging system with extended depth of focus or Taiwan Patent No. 1429943 discloses an optical imaging lens system.

With the aforesaid optical imaging systems, objects disposed with different distances are imaged at different back focus positions with that the lens or the sensor has to be moved back and forth in order to obtain clear images, and the distances are figured out indirectly via moving distances done by the actuator; the objects with different distances corresponding to the imaging lens are incapable of being imaged on different spots of the sensor. Besides, the lens is restricted with the scene depth such that, in most of the situation, it is unable to obtain the correct positions of the objects through the image clarity. Therefore, the distances of the objects corresponding to the imaging lens cannot be determined directly based on the image signals sensed by the sensor.

SUMMARY OF THE INVENTION

In order to improve deficiencies of the conventional optical imaging technique with which the distances of the objects corresponding to the imaging lens cannot be determined directly with the image signals sensed by the sensor, the present invention is proposed.

The main object of the present invention is to provide a thin plate imaging device with which a guide light plate, at least an imaging unit and at least an photosensitive unit are utilized to cause the light to conduct the total internal reflection (TIR) or reflection propagation in one dimension; the photosensitive unit is disposed in the path of the total internal reflection or the reflection propagation and located at the image focus position of the imaging unit, and objects with different object distances can be imaged on different spots of the photosensitive unit.

Another object of the present invention is to provide a thin plate imaging device which has the imaging unit be joined to the guide light plate with flat design in one dimension and maintaining an focus imaging function in another dimension; it is not necessary for the photosensitive unit being perpendicular to the optical axis, instead, it can be flatly adhered to the guide light plate and parallel to the optical axis; after the light entering the imaging unit, a refractive or reflective imaging light path is formed in one dimension and a total internal reflection or reflection propagation in another dimension to focus and image on the photosensitive unit ultimately for objects with different object distances being imaged on different spots of the photosensitive unit with image signals taken via the photosensitive unit being capable of determining relative distances of the objects directly.

A further object of the present invention is provide a thin plate imaging device with which clear images can be obtained without moving the lens or the sensor back and forth.

The thin plate imaging device according to the present invention comprises:
a guide light plate at least having an end surface;
at least an imaging unit; and
at least a photosensitive unit disposed at a side corresponding to the end surface of the guide light plate;
wherein the imaging unit allows lights to cause total internal reflection or reflection propagation in one dimension, the photosensitive unit is placed in a path of the total internal reflection or reflection propagation and disposed at an image focus position of the imaging unit to image objects with different object distances on different spots of the photosensitive unit.

According to the present invention, the photosensitive unit of the thin plate imaging device is joined to an end surface of the guide light plate.

According to the present invention, the thin plate imaging further comprises at least a reflection lens; the photosensitive unit is joined to the reflection lens; an end surface of the guide light plate is provided with a function of light reflection and parallel to the reflection lens and the photosensitive unit respectively; the imaging unit is near the guide light plate; the photosensitive unit provides a partially reflective transparent membrane corresponding to an end surface of the guide light plate; light emitted or reflected by an object is guided into the guide light plate to conduct reflection propagation between the guide light plate and the reflection lens after being focus-imaged by the imaging unit so as to image on the photosensitive unit.

According the present invention, the imaging unit of the thin plate imaging device is joined to the guide light plate; light emitted or reflected by an object is guided into the guide light plate to conduct the total internal reflection or reflection propagation and focus-imagined by the imaging unit to image on the photosensitive unit.

According to the present invention, the imaging unit of the thin plate imaging device is near the guide light plate; light emitted or reflected by an object is focused by the imaging unit and guided into the guide light plate to conduct the total internal reflection or reflection propagation and image on the photosensitive unit.

According to the present invention, the imaging unit of the thin plate imaging device is integrated with the guide light plate as a single piece.

According the present invention, the imaging unit of the thin plate imaging device comprises a first imaging unit and a second imaging unit; the light emitted or reflected by the object is guided into the guide light plate to conduct the total internal reflection or reflection propagation and focus-image on the photosensitive unit via the first imaging unit and the second imaging unit sequentially; the second imaging unit is a curved reflective imaging surface.

According to the present invention, at least an imaging unit of the thin plate imaging device is a curved reflective imaging surface; the light guided into the guide light plate to conduct the total internal reflection or reflection propagation and focus-image on the photosensitive unit via the curved reflective imaging surface.

According to the present invention, the guide light plate of the thin plate imaging device is a flat plate; at least an imaging unit is axis symmetrical or asymmetrical.

According to the present invention, the thin plate imaging further comprises a microprocessor; the microprocessor electrically connects with at least a photosensitive unit to process image signals output by the photosensitive unit; different cross-section images of an object are taken via a relative motion done with the object so as to obtain an entire image of the object through the microprocessor processing and combining the distance of the relative motion and the different cross-section images.

DETAILED DESCRIPTION OF THE INVENTION

Figure 1:
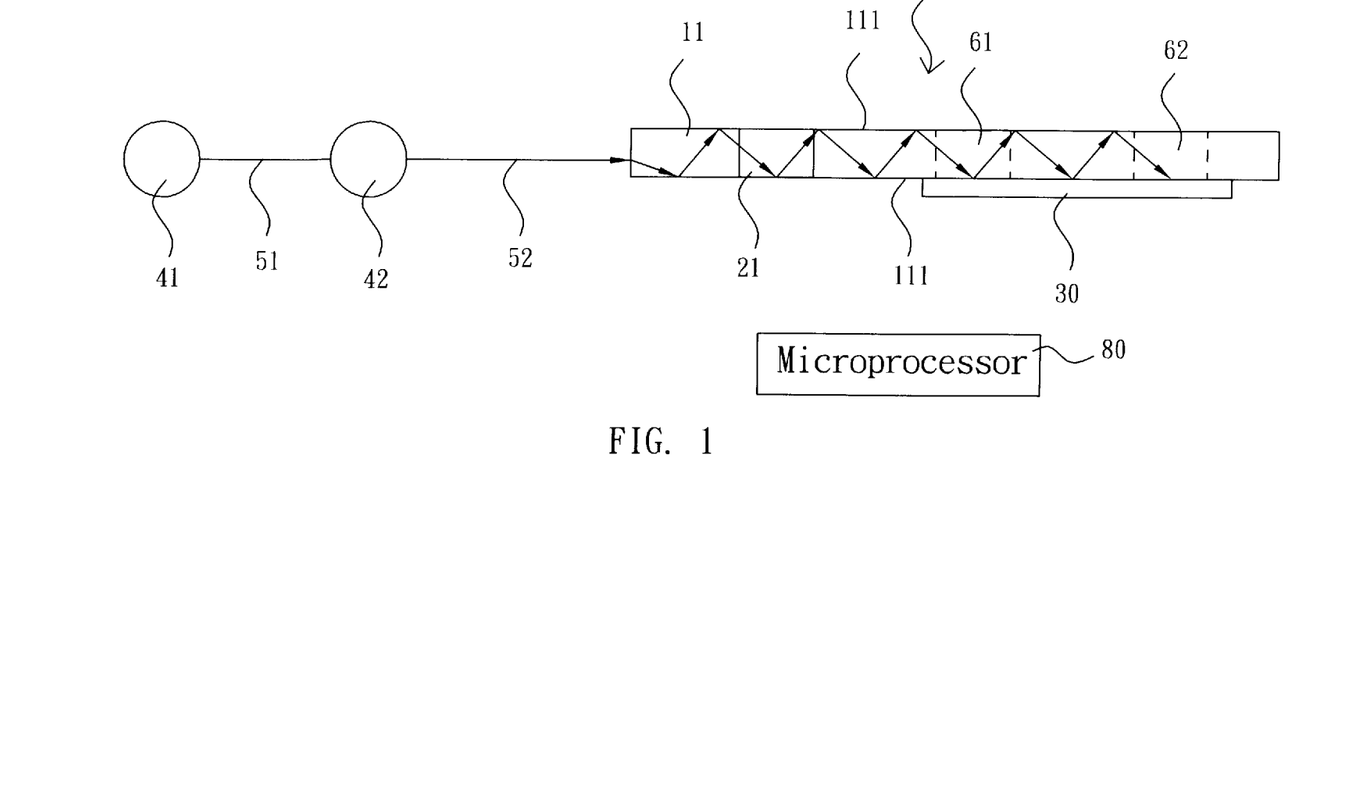
FIG. 1 is a schematic diagram of a side view of a thin plate touch device in accordance with the first embodiment of the present invention illustrating a travel path of light moving therein.
Figure 2:
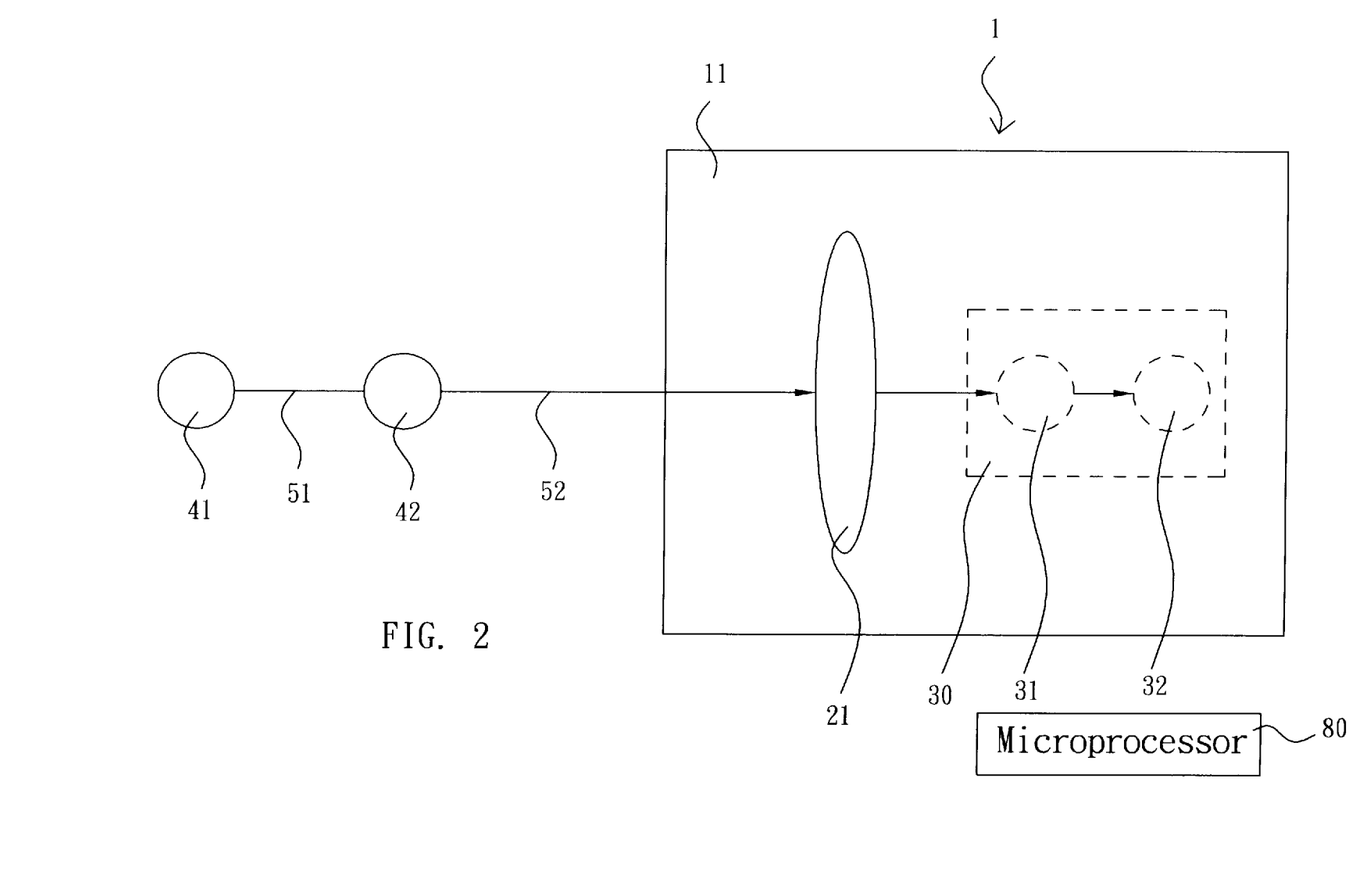
FIG. 2 is a schematic diagram of a top view of a thin plate touch device in accordance with the first embodiment of the present invention illustrating a travel path of light moving therein.

Referring to FIGS. 1 and 2, a thin plate imaging device 1 according to the first embodiment of the present invention comprises a guide light plate 11, at least an imaging unit 21 and at least a photosensitive unit 30. The guide light plate 11 has two parallel end surfaces 111, 11. The imaging unit 21 is joined to the guide light plate 11 integrally as a single piece. The imaging unit 21 is an imaging lens. The photosensitive unit 30 is joined to the guide light plate 11 and attached to one of the end surfaces 111.

When a first object 41 and a second object 42 emit or reflect lights 51, 52 respectively, the lights 51, 52 are guided to a first image focus position 61 and a second image focus position 62 corresponding to the first object 41 and the second object 42 respectively via the guide light plate 11 and the imaging unit 21 as shown in FIG. 1; a first sensing zone 31 and a second sensing zone 32 in the photosensitive unit 30 sense images corresponding to the first object 41 and the second object 42 as shown in FIG. 2; the first object 41 and the second object 42, which are disposed with different object distances, can be imaged on different spots of the photosensitive unit 30.

The lights 51, 52 in the present embodiment conduct total reflection or reflection propagation between the two end surfaces 111; the imaging unit 21 and the photosensitive unit 30 are placed in the total reflection or reflection path of the lights 51, 52 with the photosensitive unit 30 being parallel to one of the end surfaces 111 of the guide light plate 11 and located at an image focus position of the imaging unit 21; Hence, the imaging unit 21 is capable of focusing and imaging the lights 51, 52 on the photosensitive unit 30.

Figure 3:
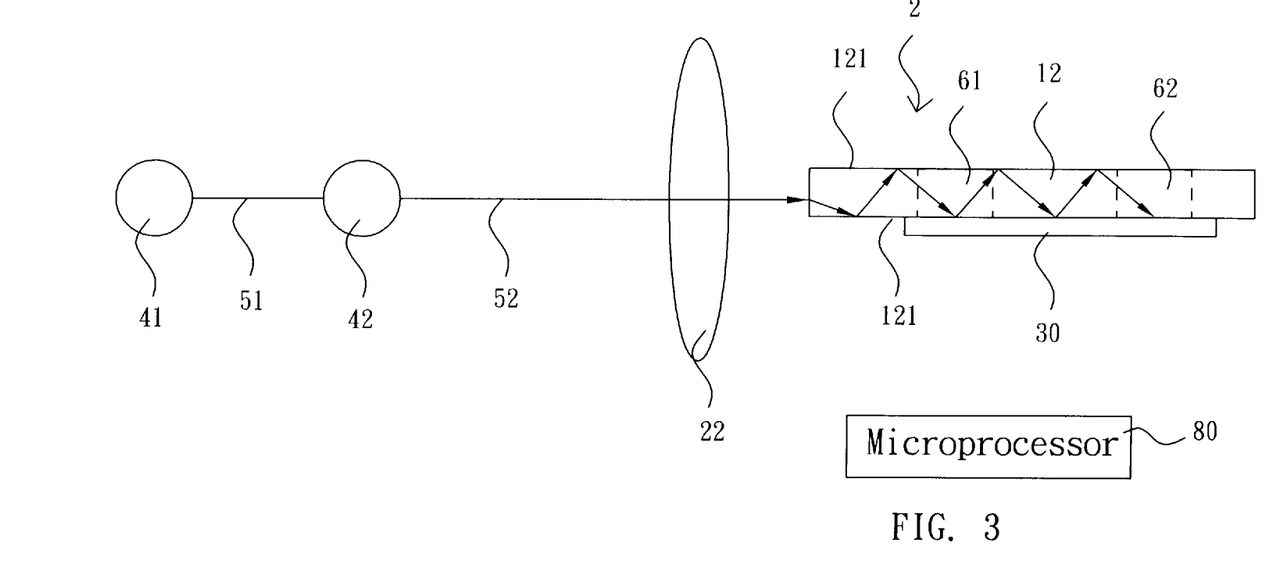
FIG. 3 is a schematic diagram of a side view of a thin plate touch device in accordance with the second embodiment of the present invention illustrating a travel path of light moving therein.
Figure 4:
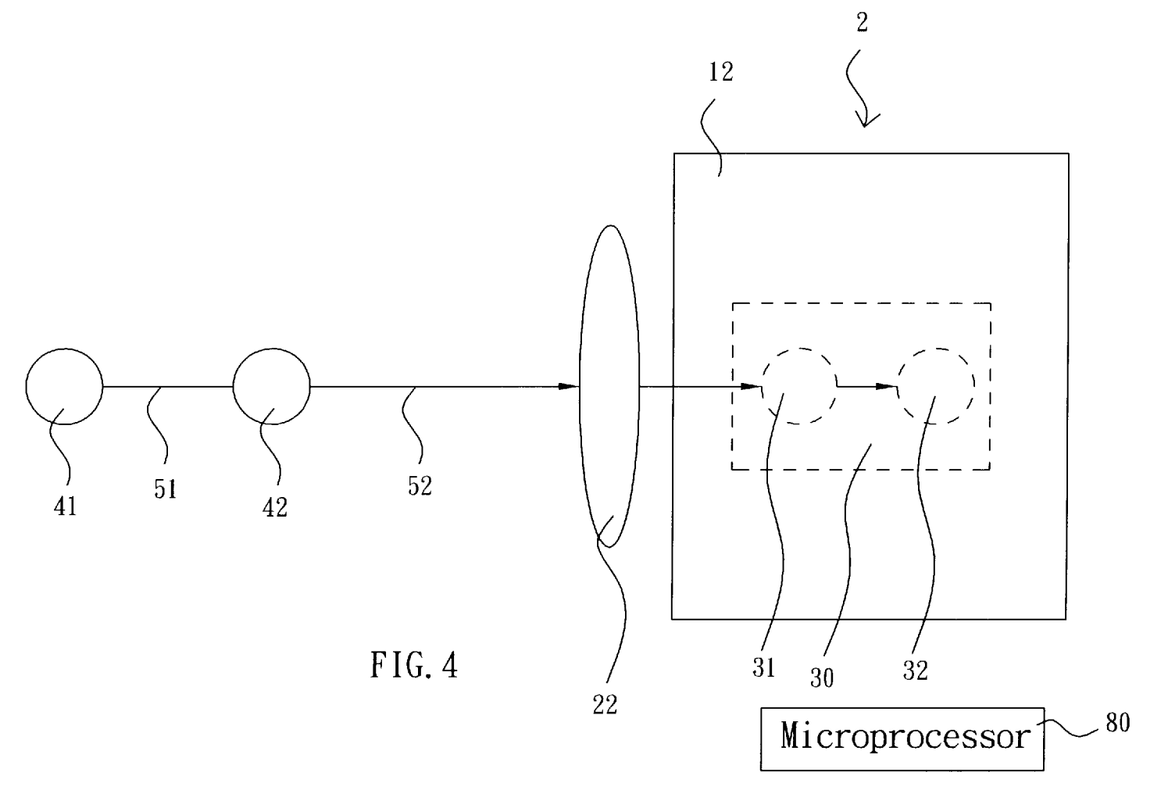
FIG. 4 is a schematic diagram of a top view of a thin plate touch device in accordance with the second embodiment of the present invention illustrating a travel path of light moving therein.

Referring to FIGS. 3 and 4, a thin plate imaging device 2 according to the second embodiment of the present invention comprises a guide light plate 12, at least an imaging unit 22 and at least a photosensitive unit 30. The guide light plate 12 has two parallel end surfaces 121, 121. The imaging unit 22 is disposed near the guide light plate 12. The imaging unit 22 is an imaging lens. The photosensitive unit 30 is joined to the guide light plate 12 and attached to one of the end surfaces 121.

When a first object 41 and a second object 42 emit or reflect lights 51, 52 respectively, the lights 51, 52 are focused by the imaging unit 22, guided to a first image focus position 61 and a second image focus position 62 corresponding to the first object 41 and the second object 42 respectively via the guide light plate 12 as shown in FIG. 3; a first sensing zone 31 and a second sensing zone 32 in the photosensitive unit 30 sense images corresponding to the first object 41 and the second object 42 as shown in FIG. 4; the first object 41 and the second object 42, which are disposed with different object distances, can be imaged on different spots of the photosensitive unit 30.

The lights 51, 52 in the present embodiment are focused by the imaging unit 22, then enter the guide light plate 12, and cause total reflection or reflection propagation between the two end surfaces 121; the photosensitive unit 30 is placed in the path of the total reflection or reflection propagation of the lights 51, 52 and disposed at an image focus position of the imaging unit 22; hence, the lights 51, 52 can be focused by the imaging unit 22, conduct total reflection or reflection propagation between the two end surfaces 121, 121 of the guide light plate 12, and imaged on the photosensitive unit 30.

Figure 5:
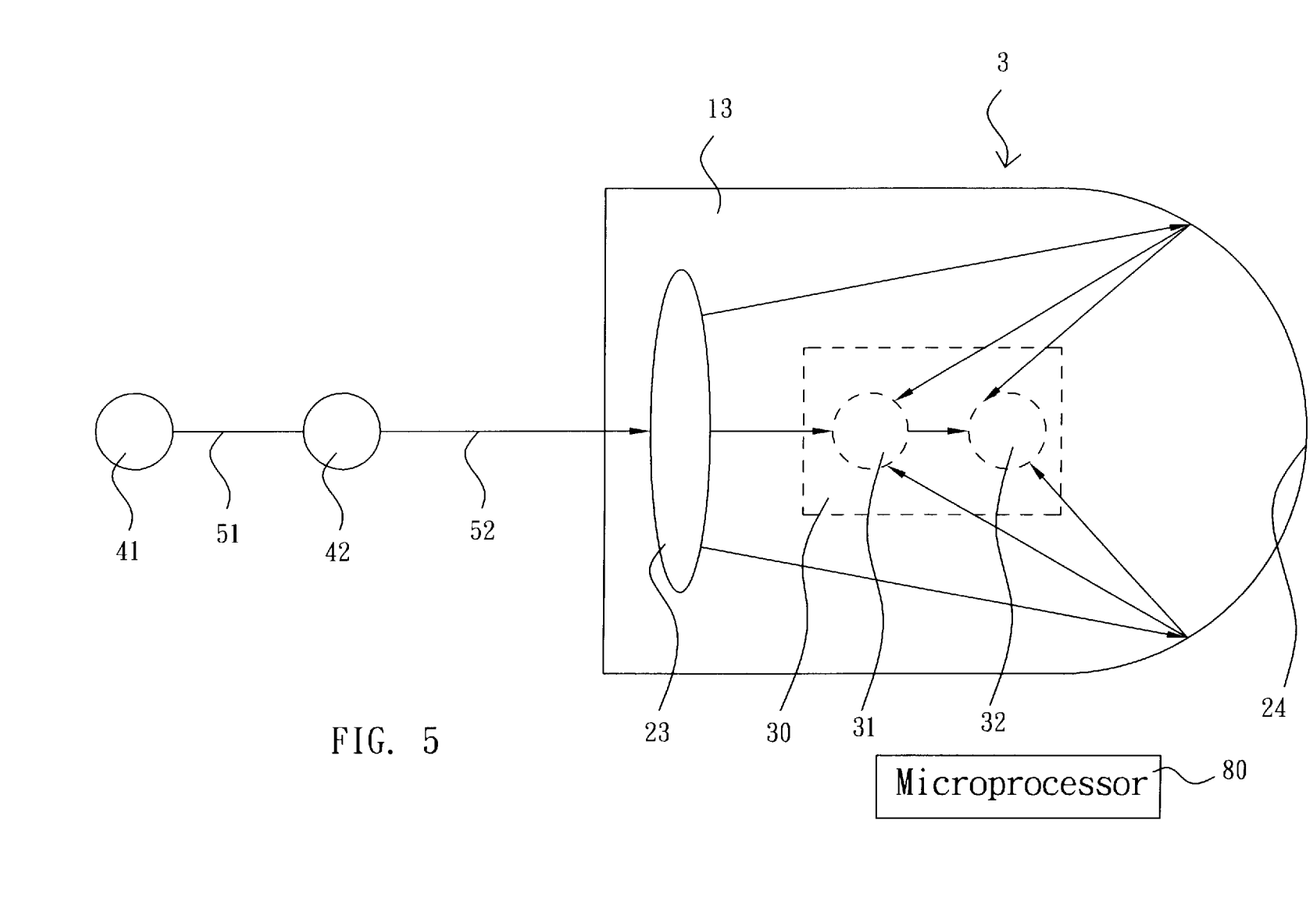
FIG. 5 is a schematic diagram of a top view of a thin plate touch device in accordance with the third embodiment of the present invention illustrating a travel path of light moving therein.

Referring to FIG. 5, a thin plate imaging device 3 according to the third embodiment of the present invention comprises a guide light plate 13, a first imaging unit 23, a second imaging unit 24 and at least a photosensitive unit 30. The guide light plate 13 is a flat plate with two parallel end surfaces similar to the guide light plate 11 shown in FIGS. 1 and 2. The first imaging unit 23 and the second imaging unit 24 are joined to the guide light plate 13 as an integral piece. The photosensitive unit 30 is joined to the guide light plate 13 and attached to one of the end surfaces.

When a first object 41 and a second object 42 emit or reflect lights 51, 52 respectively, the lights 51, 52 are guided to a first image focus position and a second image focus position corresponding to the first object 41 and the second object 42 respectively via the guide light plate 13, the first imaging unit 23 and the second imaging unit 24; a first sensing zone 31 and a second sensing zone 32 of the photosensitive unit 30 sense images corresponding to the first object 41 and the second object 42 as shown in FIG. 5; the first object 41 and the second object 42, which are disposed with different object distances, can be imaged on different spots of the photosensitive unit 30.

The lights 51, 52 in the present embodiment conduct total reflection or reflection propagation between the two end surfaces of the guide light plates 13; the first imaging unit 23, the second imaging unit 24 and the photosensitive unit 30 are placed in the total reflection or reflection propagation path of the lights 51, 52 with the photosensitive unit 30 being located at an image focus position of the first imaging unit 23 and an image focus position of the second imaging unit 24; hence, the lights 51,52, which are guided into the guide light plate 13 to conduct the total reflection or reflection propagation, are focus-imaged on the photosensitive unit 30 via the first imaging unit 23 and the second imaging unit 24 sequentially; the first imaging unit 23 is an imaging lens; the second imaging unit 24 is a curved reflective imaging surface.

Figure 6:
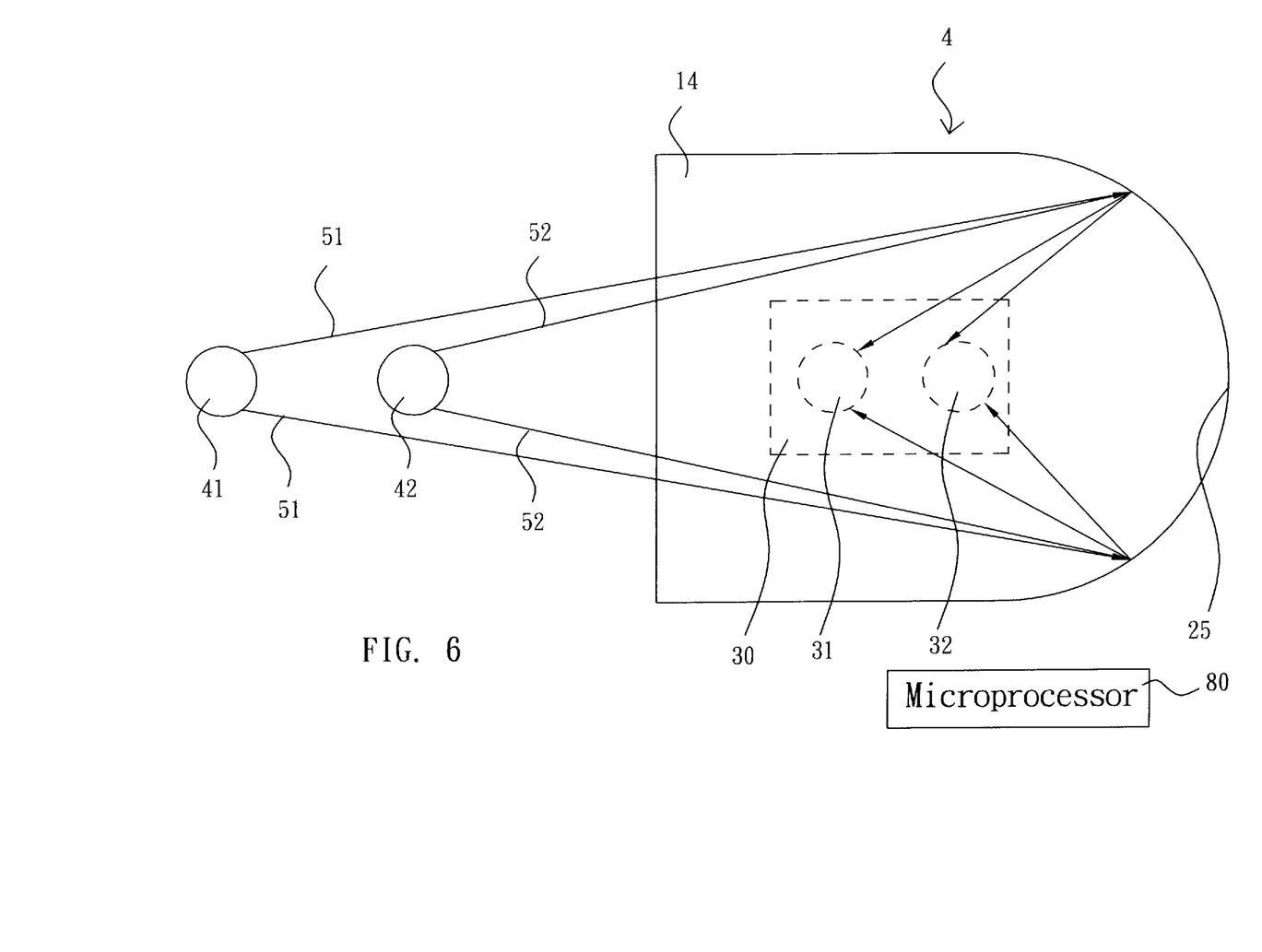
FIG. 6 is a schematic diagram of a top view of a thin plate touch device in accordance with the fourth embodiment of the present invention illustrating a travel path of light moving therein.

Referring to FIG. 6, a thin plate imaging device 4 according to the fourth embodiment of the present invention comprises a guide light plate 14, an imaging unit 25 and at least a photosensitive unit 30. The guide light plate 14 is a flat plate with two parallel end surfaces almost the same shape as the guide light plate 11 shown in FIG. 1. The imaging unit 25 is joined to the guide light plate 14 as an integral piece. The photosensitive unit 30 is joined to the guide light plate 13 and attached to one of the end surfaces.

When a first object 41 and a second object 42 emit or reflect lights 51, 52 respectively, the lights 51, 52 are guided to a first image focus position and a second image focus position corresponding to the first object 41 and the second object 42 respectively via the guide light plate 14 and the imaging unit 25; a first sensing zone 31 and a second sensing zone 32 in the photosensitive unit 30 sense images corresponding to the first object 4l and the second object 42 as shown in FIG. 6; the first object 41 and the second object 42, which are disposed with different object distances, can be imaged on different spots in the photosensitive unit 30.

The lights 51, 52 in the present embodiment conduct total reflective or reflective propagation between the two end surfaces; the imaging unit 25 and the photosensitive unit 30 are placed in the total reflection or reflection propagation path of the lights 51, 52 with the photosensitive unit 30 being located at an image focus position of the imaging unit 25; hence, the lights 51,52, which are guided into the guide light plate 15 to conduct the total reflection or reflection propagation, are focus-imaged on the photosensitive unit 30 via the imaging unit 25. The imaging unit 25 is a curved reflective imaging surface.

Figure 7:
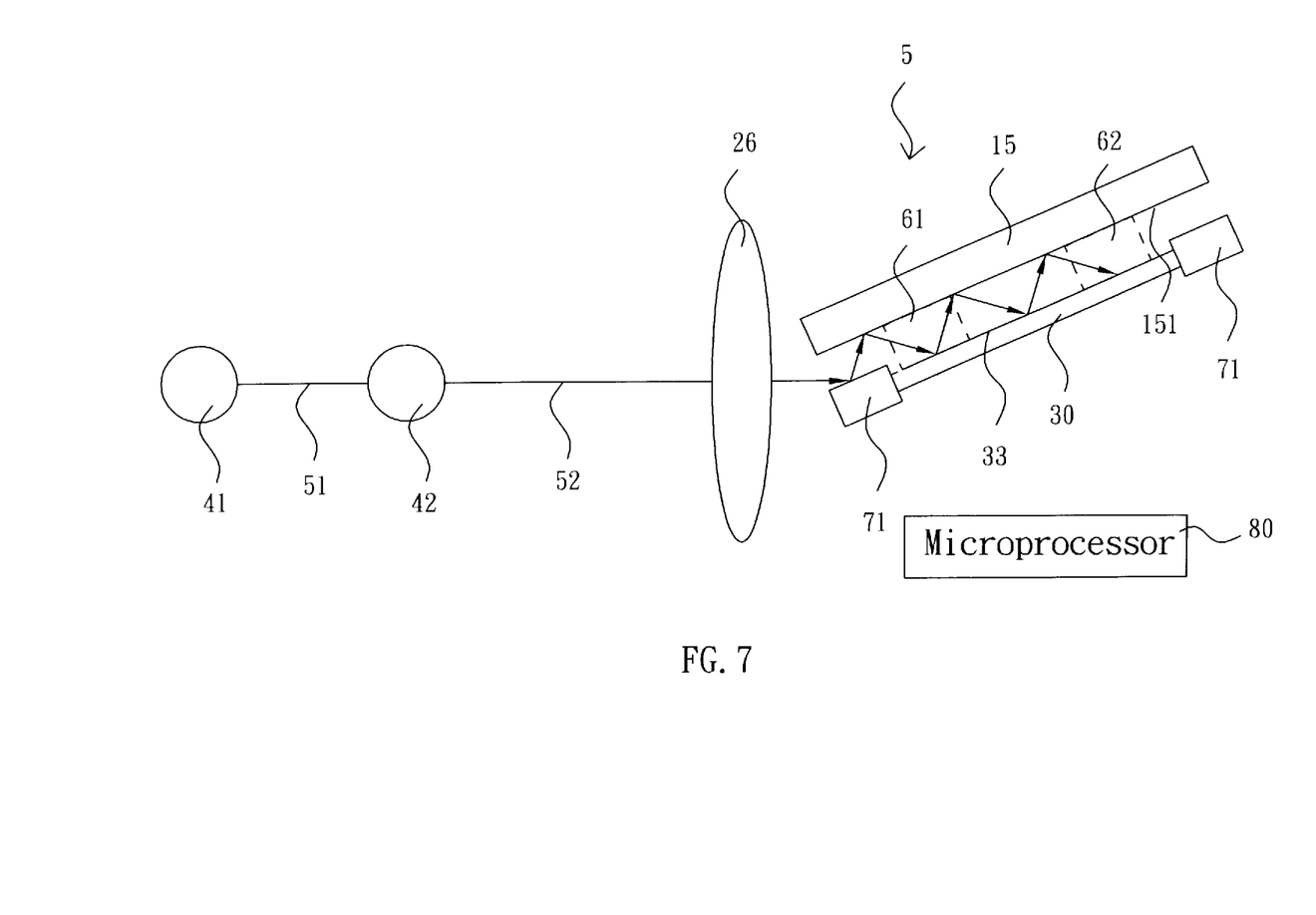
FIG. 7 is a schematic diagram of a side view of a thin plate touch device in accordance with the fifth embodiment of the present invention illustrating a travel path of light moving therein.

Referring to FIG. 7, a thin plate imaging device 5 according to the fifth embodiment of the present invention comprises a guide light plate 15, an imaging unit 26, at least a photosensitive unit 30 and a reflection lens 71. The photosensitive unit 30 is joined to the reflection lens 71 and disposed at a position corresponding to an image focus position of the imaging unit 26; the guide light plate 15 has a function of light reflection at an end surface 151 and is parallel to reflection lens 71 and the photosensitive unit 30 respectively; the imaging unit 26 is near to the guide light plate 15; the photosensitive unit 30 provides a partially reflective transparent membrane 33 to reflect part of the light shooting the photosensitive unit 30. The imaging unit 26 is an imaging lens.

When a first object 41 and a second object 42 emit or reflect lights 51, 52 respectively, the lights 51, 52 are focused by the imaging unit 26 before being guided between the guide light plate 15 and the photosensitive unit 30 with the reflection lens 71 to conduct reflection propagation, then guided to a first image focus position 61 and a second image focus position 62 corresponding to the first object 41 and the second object 42 respectively before being imaged on the photosensitive unit 30; the first object 41 and the second object 42, which are disposed with different object distances, can be imaged on different spots of the photosensitive unit 30.

Referring to FIGS. 1 to 7 again, the respective thin plate imaging devices 1, 2, 3, 4, and 5 of the first to fifth embodiments in accordance with the present invention further comprise a microprocessor 80 respectively; the microprocessor 80 electrically connects with the photosensitive unit 30 to process image signals output by the photosensitive unit 30.

The thin plate imaging device in accordance with the present invention is capable of taking an image of a cross-section of an object; Further, it is capable of taking images of different cross-sections of an object if the object moves relative to the thin plate imaging device of the present invention; Moreover, the entire image of the object can be taken by the thin plate imaging device via the microprocessor processing and combining distances with respect to the relative motion and combination of the different cross-section images.

The thin plate imaging device of the present invention has the guide light plate and the imaging unit to allow the light to conduct the total internal reflection or reflection propagation in one dimension; the photosensitive unit is disposed in the path of the total internal reflection or the reflection propagation and located at the image focus position such that clear images can be obtained without moving the imaging unit or the photosensitive unit back and forth, and objects with different object distances can be imaged on different spots of the photosensitive unit; hence, image signals obtained via the photosensitive unit can be utilized to determine relative distances of the objects directly.

The thin plate imaging device of the present invention is designed to have the imaging unit joined to the guide light plate being flat in one dimension and maintaining a focus imaging function in another dimension; it is not necessary for the photosensitive unit being perpendicular to the optical axis, instead, it can be flatly adhered to the guide light plate and parallel to the optical axis; after the light entering the imaging unit, a reflection or reflective imaging light path is formed in one dimension and a total internal reflection or reflection propagation in another dimension to focus-image on the photosensitive unit ultimately for objects with different object distances being capable of being imaged on different spots in the photosensitive unit such that image signals taken via the photosensitive unit can be utilized to determine relative distances of the objects directly to improve deficiency of the prior art of the optical imaging technique with which it is impossible to determine distances of the objects corresponding to the imaging lens directly via the image signals of the sensor.

Although the invention has been described in relation to its preferred embodiments, it is to be understood that many other possible modifications and variations can be made without departing from the spirit and scope of the invention as hereinafter claimed.

What is claimed is:

1. A thin plate imaging device, comprising:
   a guide light plate at least having an end surface to provide a function of light reflection;

at least an imaging unit disposed near said guide light plate;

at least a photosensitive unit disposed corresponding to said end surface of the guide light plate; and at least a reflection lens joined to said photosensitive unit;

wherein said imaging unit is capable of focusing and guiding lights from objects with different object distances to conduct total internal reflection or reflection propagation in one dimension in the guide light plate and provide image focus positions in the guide light plate corresponding to the objects, said photosensitive unit is placed in a path of the total internal reflection or reflection propagation and disposed at the image focus positions of said imaging unit to allow the objects to be imaged on different spots of said photosensitive unit;

wherein said end surface is parallel to said reflection lens and said photosensitive unit respectively; said photosensitive unit provides a partially reflective transparent membrane corresponding to said end surface; light emits from or reflected by each of the objects is guided into said guide light plate to conduct reflective propagation between the guide light plate and said reflection lens after being focus-imaged by said imaging unit so as to image on said photosensitive unit.

2. The thin plate imaging device as defined in claim 1 further comprises a microprocessor; said microprocessor electrically connects with at least a photosensitive unit to process image signals output by said photosensitive unit; images of different cross-sections of said object are taken with respect to relative motion of said object so as to obtain an entire image of said object through said microprocessor combining and processing a distance of the relative motion and the images of the different cross-sections.

* * * * *